United States Patent
Amrani

(10) Patent No.: US 12,361,294 B2
(45) Date of Patent: Jul. 15, 2025

(54) TRAINING SELF-CLASSIFIER USING IMAGE AUGMENTATIONS AND UNIFORM PRIOR

(71) Applicant: International Business Machines Corporation, Armonk, NY (US)

(72) Inventor: Elad Amrani, Zikhron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 17/546,901

(22) Filed: Dec. 9, 2021

(65) Prior Publication Data

US 2023/0186614 A1 Jun. 15, 2023

(51) Int. Cl.
*G06N 3/0895* (2023.01)
*G06V 10/774* (2022.01)
*G06V 10/82* (2022.01)

(52) U.S. Cl.
CPC ......... *G06N 3/0895* (2023.01); *G06V 10/774* (2022.01); *G06V 10/82* (2022.01); *G06T 2207/20132* (2013.01)

(58) Field of Classification Search
CPC .... G06V 10/82; G06V 10/774; G06N 3/0895; G06N 3/08; G06T 2207/20132
See application file for complete search history.

(56) References Cited

U.S. PATENT DOCUMENTS 11,354,778 B2 * 6/2022 Chen .................. G06T 5/70

FOREIGN PATENT DOCUMENTS

CN 103793713 A 5/2014
CN 113222998 A 8/2021

OTHER PUBLICATIONS

Amranti et al., "Self-Supervised Classification Network," arXiv:2103.10994v1, Mar. 19, 2021, 9 pages. (Year: 2021).*
Caron, Mathilde, et al. "Unsupervised learning of visual features by contrasting cluster assignments." Advances in neural information processing systems 33 (2020): 9912-9924. (Year: 2020).*
Chen, Ting, et al. "A Simple Framework for Contrastive Learning of Visual Representations." arXiv preprint arXiv:2002.05709v3 (2020). (Year: 2020).*
Dwibedi, Debidatta, et al. "With a Little Help from My Friends: Nearest-Neighbor Contrastive Learning of Visual Representations." arXiv preprint arXiv:2104.14548v2 (2021). (Year: 2021).*
Oladyshkin, Sergey, and Wolfgang Nowak. "The connection between Bayesian inference and information theory for model selection, information gain and experimental design." Entropy 21.11 (2019): 1081. (Year: 2019).*
Asano et al., "Self-Labelling Via Simultaneous Clustering and Representation Learning," Published as a conference paper at ICLR 2020, 22 pages. (Year: 2020).*

(Continued)

*Primary Examiner* — Geoffrey E Summers
(74) *Attorney, Agent, or Firm* — Randy Tejeda

(57) ABSTRACT

An example system includes a processor to receive image samples for training. The processor can generate different augmented views of each of the image samples. The processor can then train a self-classifier neural network using the different augmented views to minimize a cross entropy of the different augmented views in which a uniform prior is asserted on class predictions.

18 Claims, 8 Drawing Sheets

(56) References Cited

OTHER PUBLICATIONS

Grill et al., "Bootstrap Your Own Latent a New Approach to Self-Supervised Learning", 34th Conference on Neural Information Processing Systems (NeurIPS 2020), 2020, 14 pages.

Kwasigroch et al., "Self-Supervised Learning to Increase the Performance of Skin Lesion Classification", Published In: Electronics, Nov. 17, 2020, 16 pages.

Mell et al., "The NIST Definition of Cloud Computing", National Institute of Standards and Technology, U.S. Department of Commerce, Special Publication 800-145, 7 pages.

Patacchiola et al., "Self-Supervised Relational Reasoning for Representation Learning", 34th Conference on Neural Information Processing Systems (NeurIPS 2020), 2020, 12 pages.

Tian et al., "Divide and Contrast: Self-supervised Learning from Uncurated Data", Published in ARXIV, May 17, 2021, 17 pages.

Tsai et al., "Self-Supervised Learning From a Multi-View Perspective", ICLR 2021, Sep. 28, 2020, 18 pages.

Wu et al., "Self-supervised Domain-aware Generative Network for Generalized Zero-shot Learning", IEEE/CVF Conference on Computer Vision and Pattern Recognition (CVPR), Jun. 13, 2020, 10 pages.

Asano et al., "Self-Labelling Via Simultaneous Clustering and Representation Learning," Published as a conference paper at ICLR 2020, 22 pages.

Ji et al., "Invariant Information Clustering for Unsupervised Image Classification and Segmentation," arXiv:1807.06653v4, Aug. 22, 2019, 10 pages.

Van Gansbeke et al., "SCAN: Learning to Classify Images without Labels," arXiv:2005.12320v2, Jul. 3, 2020, 26 pages.

Xie et al. "Unsupervised Deep Embedding for Clustering Analysis," Proceedings of the 33rd International Conference on Machine Learning, PMLR 48:478-487, 2016.

Amrani et al., "Self-Supervised Classification Network," arXiv:2103.10994v1, Mar. 19, 2021, 9 pages.

\* cited by examiner

200

TRAINING SELF-CLASSIFIER USING IMAGE AUGMENTATIONS AND UNIFORM PRIOR

BACKGROUND

The present techniques relate to unsupervised classification. More specifically, the techniques relate to unsupervised classification of images.

SUMMARY

According to an embodiment described herein, a system can include processor to receive image samples for training. The processor can also further generate different augmented views of each of the image samples. The processor can also train a self-classifier neural network using the different augmented views to minimize a cross entropy of the different augmented views, wherein a uniform prior is asserted on class predictions.

According to another embodiment described herein, a method can include receiving, via a processor, image samples for training. The method can further include generating, via the processor, different augmented views of each of the image samples. The method can also further include training, via the processor, a self-classifier neural network using the different augmented views to minimize a cross entropy of the different augmented views, wherein a uniform prior is asserted on class predictions.

According to another embodiment described herein, a computer program product for training self-classifiers can include computer-readable storage medium having program code embodied therewith. The computer readable storage medium is not a transitory signal per se. The program code executable by a processor to cause the processor to receive image samples for training. The program code can also cause the processor to generate different augmented views of each of the image samples. The program code can also cause the processor to train a self-classifier neural network using the different augmented views to minimize a cross entropy of the different augmented views, wherein a uniform prior is asserted on class predictions.

According to an embodiment described herein, a system can include processor to receive an image to be classified. The processor can also further input the image into the self-classifier neural network, wherein the self-classifier neural network is trained using a non-collapsing loss function. The processor can then receive a classification of the image from the self-classifier neural network.

According to another embodiment described herein, a method can include receiving, via the processor, an image to be classified. The method can include inputting, via the processor, the image into the self-classifier neural network, wherein the self-classifier neural network is trained using a non-collapsing loss function. The method can also further include receiving, via the processor, a classification of the image from the self-classifier neural network.

DETAILED DESCRIPTION

Figure 1:
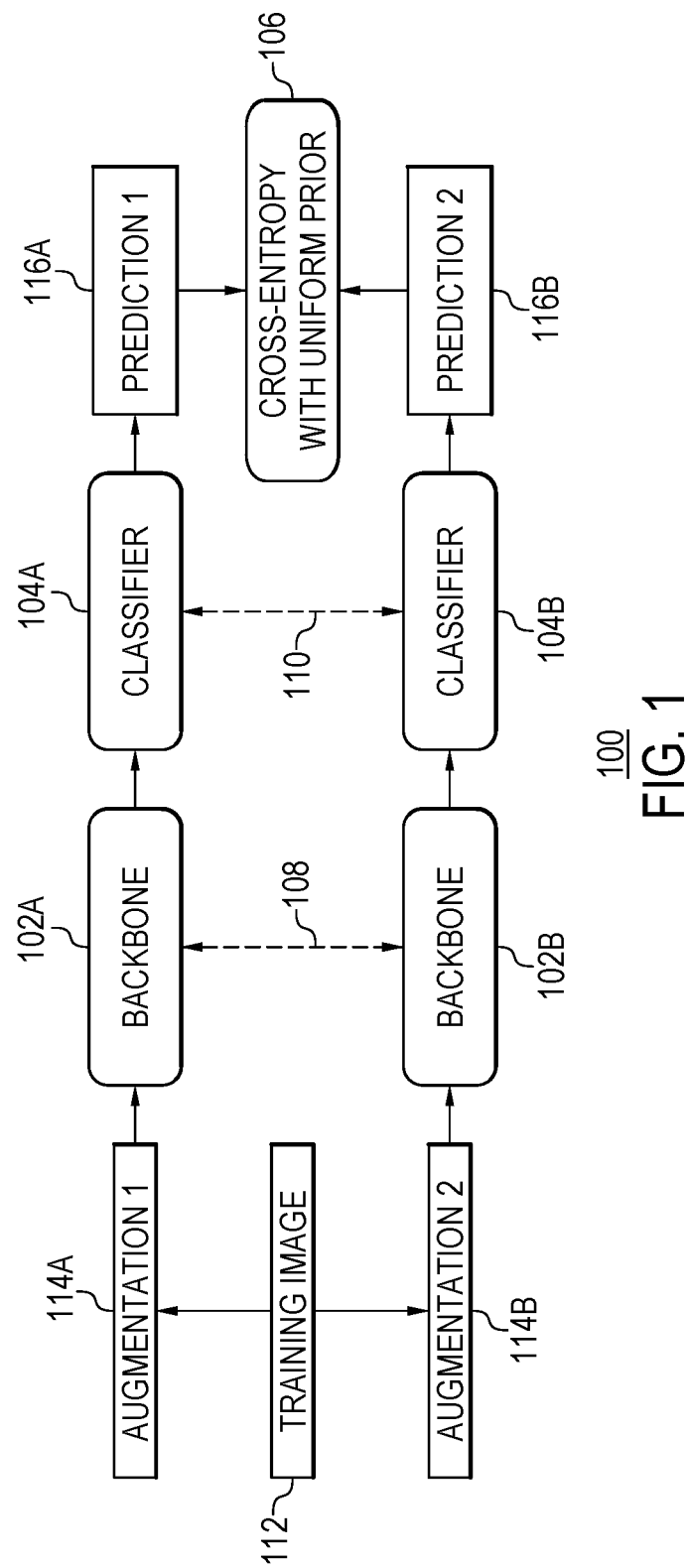
FIG. 1 is a block diagram of an example system for end-to-end training of an image classifier using cross-entropy with a uniform prior.

Self-supervised visual representation learning may be used to define and solve a pretext task such that semantically meaningful representations can be learned without any human-annotated labels. The learned representations may then be later transferred to downstream tasks. For example, the learned representations may then be later transferred to downstream tasks by fine-tuning on a smaller dataset. Some self-supervised models are based on contrastive learning. Contrastive learning models maximize the similarity between two different augmentations of the same image while simultaneously minimizing the similarity between different images, subject to different conditions. Although contrastive learning models may attain impressive performance, the objective of the various pretext tasks is not necessarily aligned with the objective of the downstream tasks, which may yield sub-optimal results. In some other types of models, clustering has also been combined with contrastive learning. However, the clustering these models may be employed as a separate step used for pseudo-labelling. For example, pseudo-labeling may involve the use of the prediction of a model as a fixed label, without back propagation.

According to embodiments of the present disclosure, an example system includes a processor to receive image samples for training. The processor can generate different augmented views of each of the image samples. The processor can then train a self-classifier neural network using the different augmented views to minimize a cross entropy of the different augmented views in which a uniform prior is asserted on class predictions. Thus, embodiments of the present disclosure enable simple and effective self-supervised single-stage end-to-end classification and representation learning approach. Unlike previous unsupervised classification works, the embodiments do not require any form of pre-training, expectation-maximization algorithm, pseudo-labelling, or external clustering. Moreover, unlike previous unsupervised representation learning works, the embodiments do not require a memory bank, a second network (momentum), external clustering, stop-gradient operation, or negative pairs. In addition, the embodiments avoid trivial solutions by incorporating a uniform prior while minimizing cross entropy for the predictions of the augmentations during training. The embodiments thus propose a model that allows learning both representations and cluster assignments in a single end-to-end manner and whose objective is more aligned with various downstream tasks. Moreover, the embodiments are relatively easy to implement and are scalable to practically unlimited amounts of data. In various experiments, the embodiments described herein were shown to set a new state of the art performance for unsupervised image classification for the ImageNet dataset. In addition, the embodiments achieved comparable results to state of the art self-supervised representation learning techniques. Moreover, the embodiments are able to achieve this performance without the need for any pre-training nor creation of any pseudo-labels for training.

With reference now to FIG. 1, a block diagram shows an example system for end-to-end training of an image classifier using cross-entropy with a uniform prior. The example system is generally referred to by the reference number 100. FIG. 1 includes a first backbone 102A communicatively coupled to a second backbone 102B. The system 100 further includes a classifier 104A communicatively coupled to the backbone 102A. The system 100 also includes a classifier 104B communicatively coupled to the backbone 102B. For example, the backbone 102B may have the same structure as backbone 102A and have shared parameters. In various examples, the backbone 102A and 102B may be convolutional neural networks. As one example, the backbones 102A and 102B may be the ResNet-50 network, released 2016. Similarly, the classifier 104B may have the same structure as classifier 104A. As one example, the classifier 104A and 104B may be fully connected layers. The system 100 includes a cross-entropy with uniform prior loss function 106. The backbone 102A and backbone 102B have a shared set of parameters indicated by arrow 108. The classifier 104A and 104B also have a set of parameters as indicated by arrow 110. In other words, backbone 102A and 102B may be the same backbone and the classifiers 104A and 104B may be the same classifier, but are shown as two separate sets for ease of explanation. The system 100 is shown receiving a training image 112. The training image 112 is shown being used to generate augmentation 114A and augmentation 114B. The classifier 104A is shown outputting a prediction 116A. For example, the prediction 116A may be the probability of y given augmentation x1 114A $p(y|x_1)$. Similarly, the classifier 104B is shown outputting a prediction 116B. For example, the prediction 116B may be the probability of y given augmentation $x_2$ 114B $p(y|x_2)$. In some examples, a number of classes (not shown) may also be received as input. For example, a user may define the number of classes to be used in the system 100. In some examples, a multi-head classifier can also be used with various numbers of classes.

In the example of FIG. 1, the system 100 may train an end-to-end neural network using augmentations 114A and 114B of training image 112. For example, knowing only the number of classes C, the system 100 can learn an unsupervised classifier, referred to herein as a Self-Classifier, such that two different augmentations 114A and 114B of the same image 112 are classified similarly. In various examples, the augmentations may be generated using the bootstrap your own latent (BYOL) approach, released 2020. For example, BYOL may include the use of color jittering, Gaussian blur, solarization, or any combination thereof on the training image 112. The augmentations may also include the use of multi-crop on the training image 112. For example, two global views of 224×224 and six local views of 96×96 may be used. In some examples, the augmentation generation may also use nearest neighbor augmentation on the training image 112. For example, a queue for nearest neighbor augmentation may set to 256K. In various examples, in one example, the backbones 102A and 102B may be a convolutional neural network, such as ResNet-50. In some examples, for projection heads, the backbones 102A and 102B may use a multilayer perceptron (MLP) with 2 layers with batch-normalization (BN). For example, the two layers may have sizes or 4096 and 128. The MLP may have leaky-ReLU activations, and ℓ2 normalization after the last layer. In some examples, on top of the projection head MLP, four classification heads may be placed into 1K, 2K, 4K and 8K classes, respectively. Each classification head may be a simple ℓ2-normalized linear layer. For example, each classification head may be a cosine classifier. In some examples, row-softmax temperature $\tau_{row}$ may be set to 0.1, while column-softmax temperature $\tau_{col}$ may be set to 0.05. In various examples, training may include the use of an optimizer, such as the LARS optimizer. In various examples, hyper-parameters may include a learning rate of 4.8 and weight decay of 10-6. In some examples, the learning rate may be linearly ramped up (starting from 0.3) over the first 10 epochs, and then decreased using a cosine scheduler for 790 epochs with a final value of 0.0048 for a total of 800 epochs. In some examples, for training, a batch size of 4096 may be distributed across 64 GPUs.

For example, the backbone 102A and the classifier 104A may classify a first augmentation 114A of training image 112. The backbone 102B and classifier 104B may similarly classify a second augmentation 114B of the training image 112. The classifiers 104A and 104B may thus output predictions 116A and 116B, respectively. The output predictions 116A and 116B may then be minimized using a cross-entropy with uniform prior loss function 106. In this manner, the system 100 can train the backbone 102A and classifier 104A to learn parameters of a neural network and class assignments simultaneously. For example, the system 100 can train the network to learn the output representations from the backbones 102A and 102B and cluster labels output by the classifiers 104A and 104B in a single-stage end-to-end manner, using only a minibatch stochastic gradient descent (SGD).

Still referring to FIG. 1, in practice, such a classification task may be prone to degenerate solutions. For example, using a standard cross-entropy loss function, all samples may be assigned to the same class. For example, given $x_1$, $x_2$ denoting two different augmented views 114A and 114B of the same image sample x 112, a goal of the system 100 may be to learn a classifier $y \triangleq f(x_1) \in [C]$, where C is the given number of classes, such that the two augmented views of the same sample are classified similarly, while avoiding degenerate solutions. A naive approach to this would be minimizing the following cross-entropy loss:

$$\tilde{\ell}(x_1, x_2) = \Sigma_{y \in [C]} p(y|x_2) \log p(y|x_1) \qquad \text{Eq. 1}$$

where $p(y|x)$ is a row softmax with temperature $\tau_{row}$ of the matrix of logits S produced by the model (backbone+classifier) for all classes (columns) and batch samples (rows). However, without additional regularization, an attempt to minimize Eq. 1 may quickly converge to a degenerate solution in which the network predicts a constant y regardless of the x.

In various examples, to avoid such trivial solutions, the system 100 can assert a uniform prior on the standard cross-entropy loss function, such that a solution with an equipartition of the data is an optimal solution. For example, according to the Bayes and Total Probability laws, the following equations may be obtained:

$$p(y|x_2) = \frac{p(y)p(y|x_2)}{p(x_2)} = \frac{p(y)p(x_2|y)}{\sum_{\tilde{y} \in [C]} p(x_2|\tilde{y})p(\tilde{y})} \qquad \text{Eq. 2}$$

-continued $$p(y \mid x_1) = \frac{p(y)p(y \mid x_1)}{p(y)} = \frac{p(y)p(y \mid x_1)}{\sum_{\tilde{x_1} \in B_1} p(y \mid \tilde{x_1})p(\tilde{x_1})} \quad \text{Eq. 3}$$

where B is a batch of N samples, $B_1$ are the first augmentations of samples of batch B, and p(x|y) is a column softmax of the aforementioned matrix of logits S with the temperature $\tau_{col}$. In various examples, assuming that $p(x_1)$ is uniform under the assumption that the training samples are equiprobable, and, assuming a uniform prior for p(y), the following modified loss function may be obtained:

$$\ell(x_1, x_2) = -\sum_{y \in [C]} \frac{p(x_2 \mid y)}{\sum_{\tilde{y}} p(x_2 \mid \tilde{y})} \log \left( \frac{N}{C} \frac{p(y \mid x_1)}{\sum_{\tilde{x_1}} p(y \mid \tilde{x_1})} \right) \quad \text{Eq. 4}$$

where p(y) and p(ỹ) cancel out in Eq. 2, and $p(y)/p(x_1)$ becomes N/C in Eq. 3. Eq. 4 is thus mathematically equivalent to the cross entropy function of Eq. 1, under the assumption that p(y) and p(x) are uniform. In some examples, a symmetric variant of this loss may be calculated using the Equation:

$$\mathcal{L} = \frac{1}{2}(\ell(x_1, x_2) + \ell(x_2, x_1)) \quad \text{Eq. 5}$$

For example, the self-classifier may be trained using the following example pseudocode: for x in loader:

```
s1 = model(aug(x)) # NxC logits
s2 = model(aug(x)) # NxC logits
log_y_x1 = log(N/C * norm0(softmax1(s1/t_r)))
log_y_x2 = log(N/C * norm0(softmax1(s2/t_r)))
y_x1 = norm1(softmax0(s1/t_c))
y_x2 = norm1(softmax0(s2/t_c))
l1 = - sum(y_x2 * log_y_x1) / N
l2 = - sum(y_x1 * log_y_x2) / N
L = (l1 + l2) / 2
L.backward( )
optimizer.step( )
``` where N is the number of samples in batch, C is the number of classes, t_r and t_c are the row and column softmax temperatures, aug( ) is a random augmentation, softmaxX( ) is a softmax over dimension X, and normX( ) is an L1 normalization over dimension X.

Figure 3:
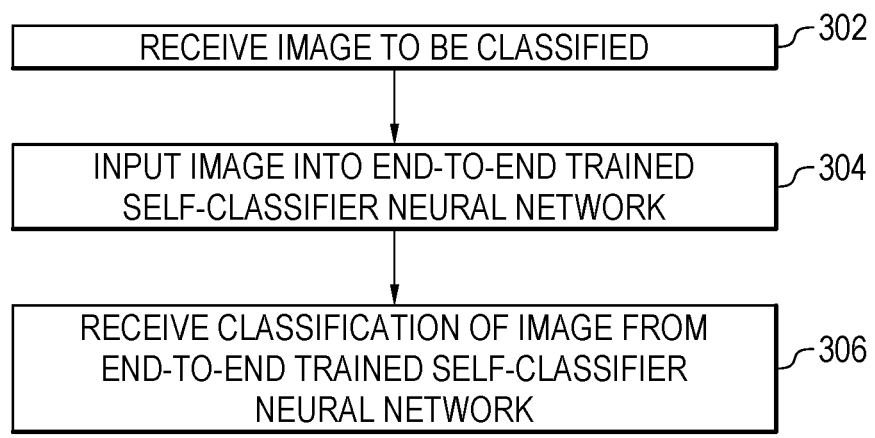
FIG. 3 is a process flow diagram of an example method that can classify images using a self-classifier trained using cross-entropy with a uniform prior.

In various examples, once trained, the self-classifier can be used to classify input images, as described in FIG. 3. In some examples, the self-classifier can be further fine-tuned to perform additional downstream tasks, such as object detection, as described in FIG. 4.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
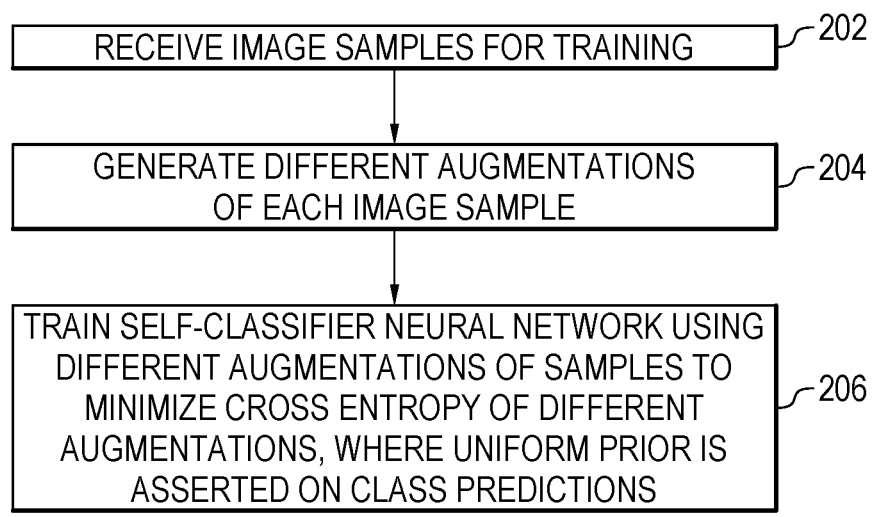
FIG. 2 is a process flow diagram of an example method that can train an image classifier in an end-to-end manner using cross-entropy with a uniform prior.

FIG. 2 is a process flow diagram of an example method that can train an image classifier in an end-to-end manner using cross-entropy with a uniform prior. The method 200 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 202, a processor receives image samples for training. In various examples, the processor also receives a number of classes for the training.

At block 204, the processor generates different augmented views of each of the image samples. For example, the processor can modify each of the image samples using color jittering, Gaussian blur, and solarization. In some examples, the processor can modify each of the image samples using a multi-crop. In various examples, the processor can modify each of the image samples using nearest neighbor augmentation.

At block 206, the processor trains a self-classifier neural network using the different augmented views to minimize a cross entropy of the different augmented views, wherein a uniform prior is asserted on class predictions. For example, the processor can learn labels and representations simultaneously in a single stage by optimizing for same-class prediction of the different augmented views of the same sample.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

FIG. 3 is a process flow diagram of an example method that can classify images using a self-classifier trained using cross-entropy with a uniform prior. The method 300 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 302, a processor receives an image to be classified. For example, the image may be a test image received at an inference stage after training.

At block 304, the processor inputs the image into an end-to-end trained self-classifier neural network. In various examples, the self-classifier neural network may be trained using a non-collapsing loss function. For example, the non-collapsing loss function may be defined based on Bayes theorem and the law of total probability. As one example, the end-to-end trained self-classifier neural network may be the self-classifier neural network trained in FIG. 2.

At block 306, the processor receives a classification of the image from the self-classifier neural network. For example, the classification may be one of several classifications formulated during training of the self-classifier neural network.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
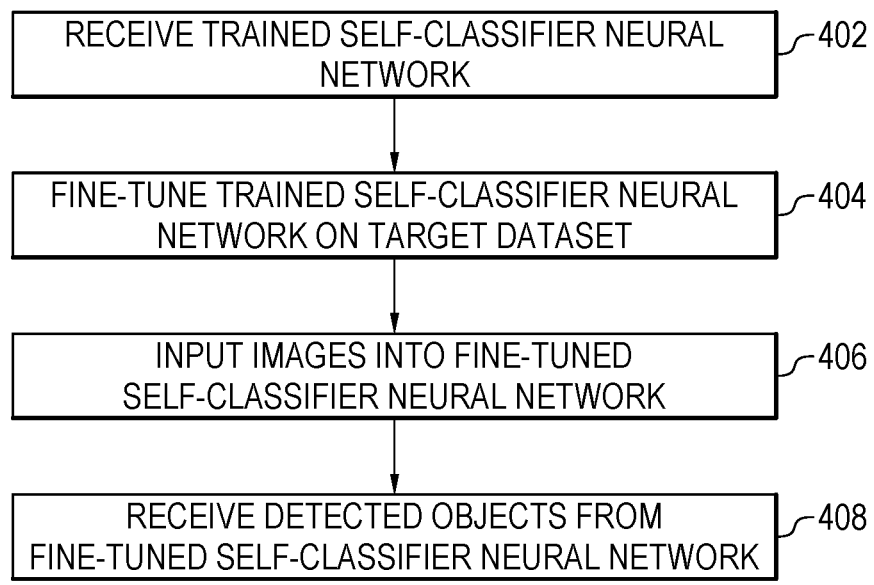
FIG. 4 is a process flow diagram of an example method that can fine-tune a self-classifier to perform object detection.

FIG. 4 is a process flow diagram of an example method that can fine-tune a self-classifier to perform object detection. The method 400 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 402, a processor receives a trained self-classifier neural network. For example, the self-classifier neural network may be the self-supervised pre-trained self-classifier neural network shown being trained in FIG. 2. In various examples, the pre-trained self-classifier neural network is used to initialize the parameters of a detection network.

At block 404, the processor fine-tunes the trained self-classifier neural network on a target dataset. For example, the target dataset may be smaller than the dataset used to train the self-classifier neural network in FIG. 2. In various examples, the self-classifier neural network may be fine-tuned with detection labels using supervised learning.

At block 406, the processor inputs images into the fine-tuned self-classifier neural network. For example, the images may include one or more objects to be detected.

At block 408, the processor receives detected objects from the fine-tuned self-classifier neural network. For example, the processor may receive a predicted bounding boxes and labels for each of the input images.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method can include fine-tuning for any additional types of downstream tasks. In various examples, such downstream tasks may include computer vision tasks, such as classification, visual question answering, pose estimation, action recognition, among other tasks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
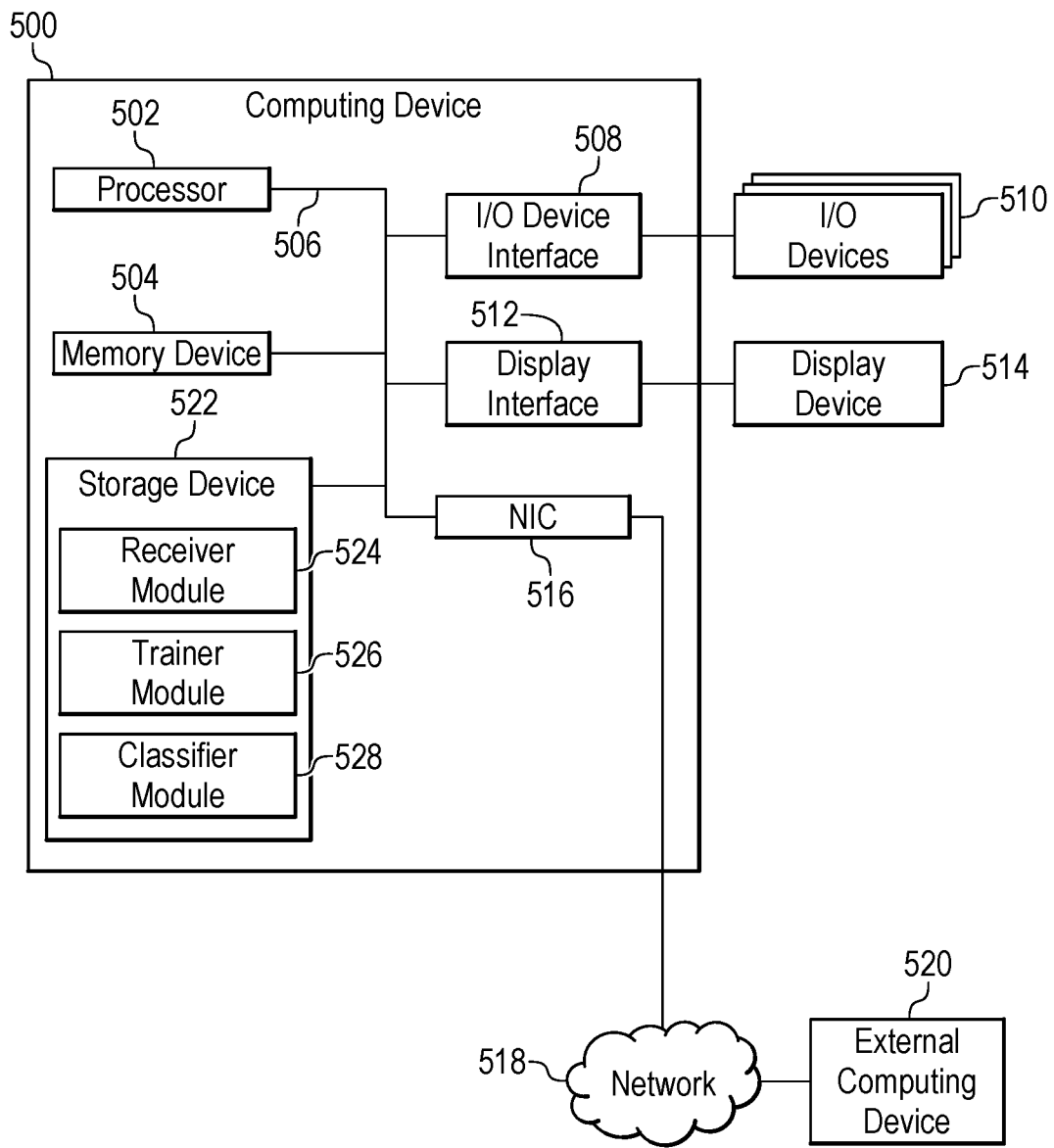
FIG. 5 is a block diagram of an example computing device that can train a self-classifier to classify images using cross-entropy with a uniform prior.

FIG. 5 is block diagram of an example computing device that can train a self-classifier to classify images using cross-entropy with a uniform prior. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a trainer module 526, and a classifier module 528. The receiver module 524 can receive image samples for training. In some examples, the receiver module 524 can receive a number of classes for training. The trainer module 526 can generate different augmented views of each of the image samples. The trainer module 526 can train a self-classifier neural network using the different augmented views to minimize a cross entropy of the different augmented views, wherein a uniform prior is asserted on class predictions. In some examples, the trainer module 526 can calculate the cross entropy using a non-collapsing loss function. For example, the non-collapsing loss function may be based on Bayes theorem and the law of total probability. The non-collapsing loss function is defined with a uniform prior asserted on class predictions. In various examples, the self-classifier neural network may include a backbone including a convolutional neural network and a classifier coupled to the backbone. For example, the self-classifier neural network may include a projection multilayer perceptron (MLP) and a linear classification head. The classifier module 528 can receive an image to be classified, input the image into the trained self-classifier neural network, and receive a classification from the trained self-classifier neural network.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). For example, the computing device 500 may also include a finer tuner to fine-tune the self-classifier neural network on a smaller dataset to perform a downstream task. Furthermore, any of the functionalities of the receiver module 524, the trainer module 526, and the classifier module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the trainer module 526, and the classifier module 528 can be implemented with logic, wherein the logic, as referred to herein, can include any suitable hardware (e.g., a processor, among others), software (e.g., an application, among others), firmware, or any suitable combination of hardware, software, and firmware.

Figure 6:
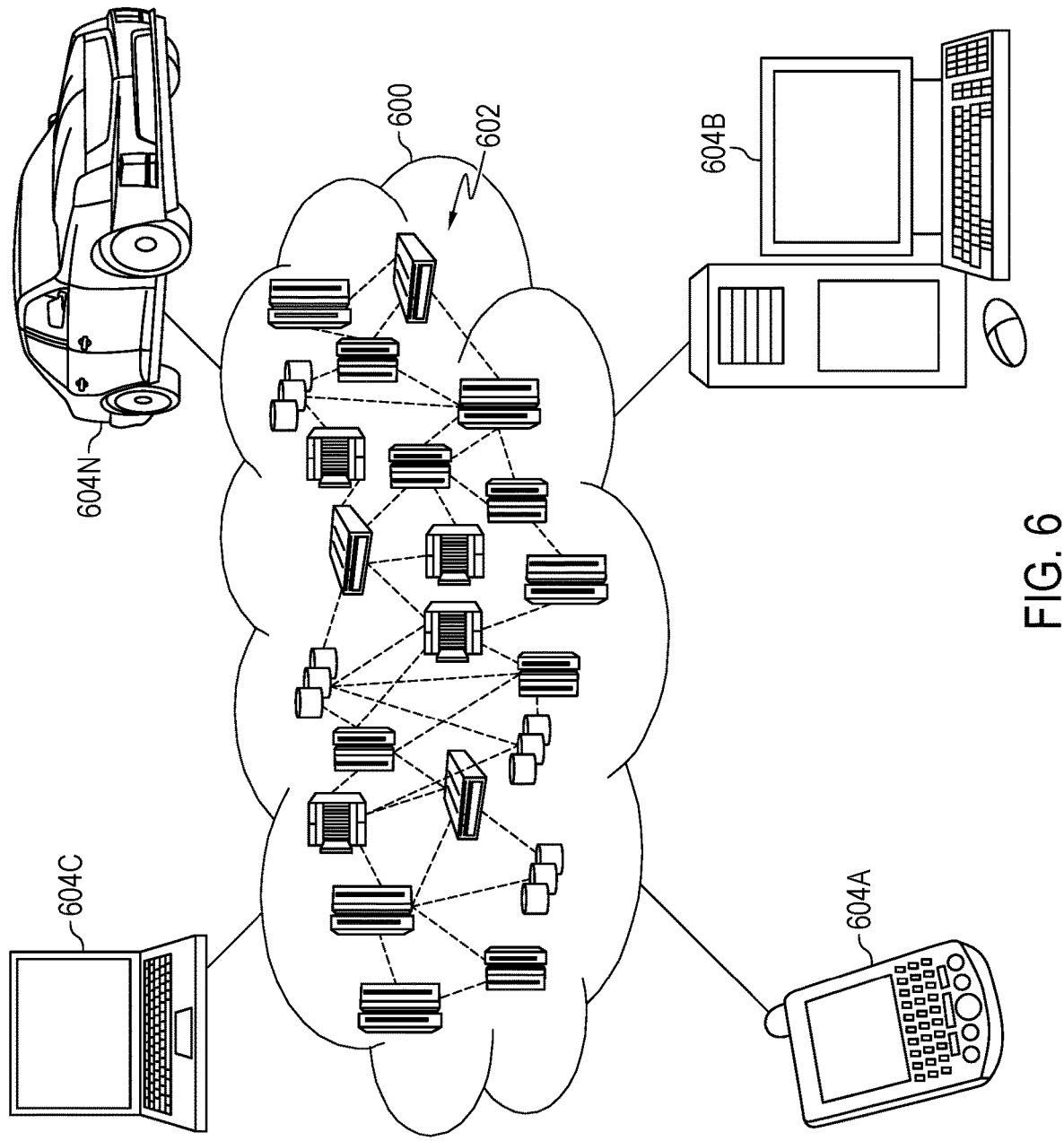
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
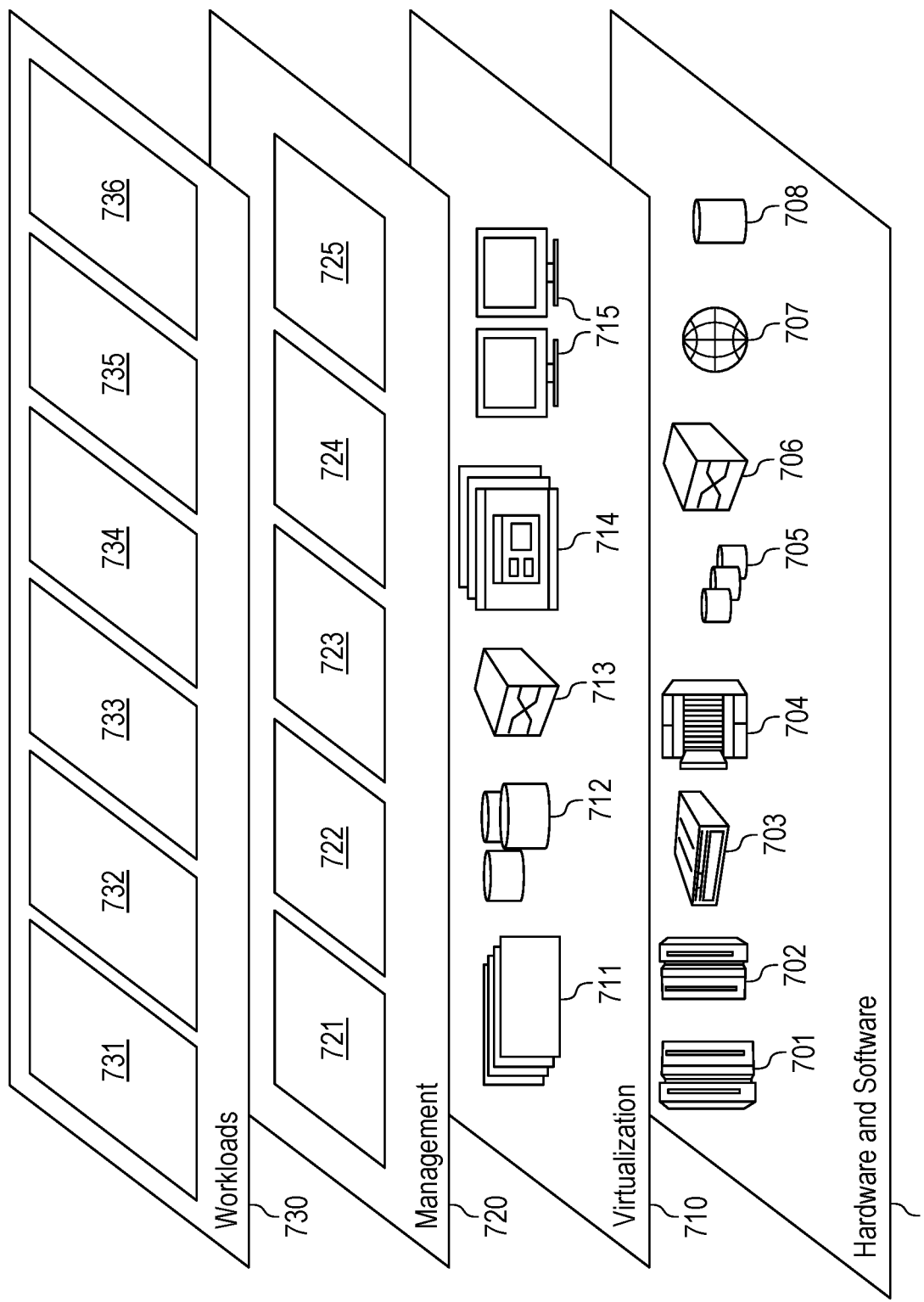
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and image classification 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
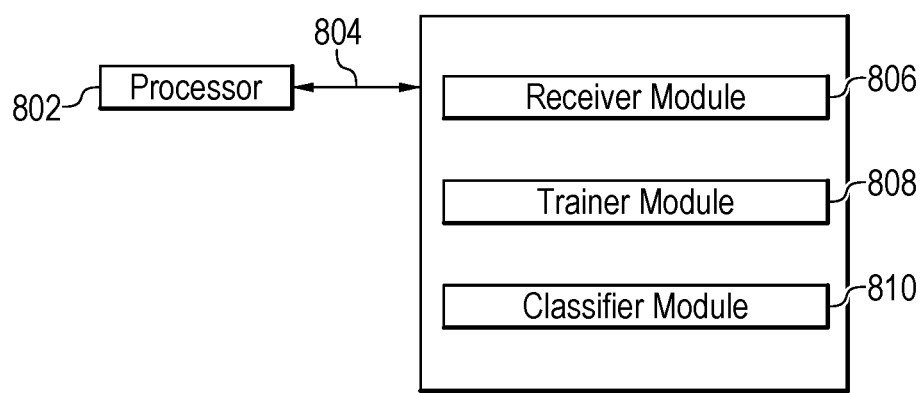
FIG. 8 is an example tangible, non-transitory computer-readable medium that can train a self-classifier to classify images using cross-entropy with a uniform prior.

Referring now to FIG. 8, a block diagram is depicted of an example tangible, non-transitory computer-readable medium 800 that can train a self-classifier to classify images using cross-entropy with a uniform prior. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200-400 of FIGS. 2-4.

The various software components discussed herein may be stored on the tangible, non-transitory, computer-readable medium 800, as indicated in FIG. 8. For example, a receiver module 806 includes code to receive image samples for training. The module 806 also includes code to receive images to be classified. In some examples, the module 806 includes code to receive a number of classes for the training. In some examples, the module 806 includes code to. A trainer module 808 includes code to generate different augmented views of each of the image samples. For example, the trainer module 808 includes code to modify each of the image samples using color jittering, Gaussian blur, and solarization. In some examples, the trainer module 808 includes code to modify each of the image samples using a multi-crop. In various examples, the trainer module 808 includes code to modify each of the image samples using nearest neighbor augmentation. The trainer module 808 further includes code to train a self-classifier neural network using the different augmented views to minimize a cross entropy of the different augmented views. For example, the trainer module 808 may include code to assert a uniform prior on class predictions. The module 808 also includes code to learn labels and representations simultaneously in a single stage by optimizing for same-class prediction of the different augmented views of the same sample. A classifier module 810 includes code to receive an image to be classified. The module 810 also includes code to generate a classification of the image.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application. For example, the computer-readable medium 800 may also include a fine tuner (not shown) to fine-tune the trained self-classifier neural network on a target dataset. The computer-readable medium 800 may include code to input images into the fine-tuned self-classifier neural network and receive a detected object from the fine-tuned self-classifier neural network.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive image samples for training;
generate different augmented views of each of the image samples; and
train a self-classifier neural network using the different augmented views to minimize a cross entropy of the different augmented views, wherein a uniform prior is asserted on the cross entropy utilizing a column softmax of a matrix of logits produced by a backbone and an attached classifier, wherein training the self-classifier neural network comprises learning labels and representations simultaneously in a single stage by optimizing for same-class prediction of the different augmented views of a same sample.

2. The system of claim 1, wherein the processor is to calculate the cross entropy using a non-collapsing loss function.

3. The system of claim 2, wherein the non-collapsing loss function is based on Bayes theorem and the law of total probability.

4. The system of claim 1, wherein the self-classifier neural network comprises the backbone comprising a convolutional neural network and the attached classifier coupled to the backbone.

5. The system of claim 4, wherein the self-classifier neural network comprises a projection multilayer perceptron (MLP) and a linear classification head.

6. The system of claim 1, wherein the processor is to fine-tune the self-classifier neural network on a smaller dataset to perform a downstream task.

7. The system of claim 1, wherein the processor is to receive an image to be classified, input the image into the trained self-classifier neural network, and receive a classification from the trained self-classifier neural network.

8. A computer-implemented method, comprising:
receiving, via a processor, image samples for training;
generating, via the processor, different augmented views of each of the image samples; and
training, via the processor, a self-classifier neural network using the different augmented views to minimize a cross entropy of the different augmented views, wherein a uniform prior is asserted on the cross entropy utilizing a column softmax of a matrix of logits produced by a backbone and an attached classifier, wherein training the self-classifier neural network comprises learning labels and representations simultaneously in a single stage by optimizing for same-class prediction of the different augmented views of a same sample.

9. The computer-implemented method of claim 8, comprising:
receiving, via the processor, an image to be classified;
inputting, via the processor, the image into the self-classifier neural network; and
receiving, via the processor, a classification of the image from the self-classifier neural network.

10. The computer-implemented method of claim 8, wherein generating the different augmented views comprises modifying each of the image samples using color jittering, Gaussian blur, and solarization.

11. The computer-implemented method of claim 8, wherein generating the different augmented views comprises modifying each of the image samples using a multi-crop.

12. The computer-implemented method of claim 8, wherein generating the different augmented views comprises generating a plurality of global views and local views of the image samples.

13. The computer-implemented method of claim 8, comprising:
fine-tuning, via the processor, the self-classifier neural network on a target dataset;
inputting, via the processor, an image into the fine-tuned self-classifier neural network; and
receiving, via the processor, a detected object from the fine-tuned self-classifier neural network.

14. A computer program product for training self-classifiers, the computer program product comprising a computer-readable storage medium having program code embodied therewith, wherein the computer-readable storage medium is not a transitory signal per se, the program code executable by a processor to cause the processor to:
receive image samples for training;
generate different augmented views of each of the image samples; and
train a self-classifier neural network using the different augmented views to minimize a cross entropy of the different augmented views, wherein a uniform prior is asserted on the cross entropy utilizing a column softmax of a matrix of logits produced by a backbone and an attached classifier, wherein the program code to train the self-classifier neural network comprises program code to learn labels and representations simultaneously in a single stage by optimizing for same-class prediction of the different augmented views of a same sample.

15. The computer program product of claim 14, further comprising program code executable by the processor to:
receive an image to be classified;
generate, via the self-classifier neural network, a classification of the image.

16. The computer program product of claim 14, further comprising program code executable by the processor to modify each of the image samples using color jittering, Gaussian blur, and solarization.

17. The computer program product of claim 14, further comprising program code executable by the processor to modify each of the image samples using a multi-crop.

18. The computer program product of claim 14, further comprising program code executable by the processor to:
fine-tune the trained self-classifier neural network on a target dataset;
input an image into the fine-tuned self-classifier neural network; and
receive a detected object from the fine-tuned self-classifier neural network.

\* \* \* \* \*